United States Patent [19]

Kotake et al.

[11] Patent Number: 5,263,082
[45] Date of Patent: Nov. 16, 1993

[54] TEXT MAIL SYSTEM USING ISDN AND ISDN COMMUNICATION TERMINAL DEVICE FOR USE THEREIN

[75] Inventors: Shirou Kotake, Hachioji; Hideki Hayakawa, Hino, both of Japan

[73] Assignee: Kabushiki Kaisha Toshiba, Kawasaki, Japan

[21] Appl. No.: 757,265

[22] Filed: Sep. 10, 1991

[30] Foreign Application Priority Data

Sep. 13, 1990 [JP] Japan .................................. 2-243279

[51] Int. Cl.⁵ ...................... H04M 11/00; H04M 1/64
[52] U.S. Cl. .................................... 379/93; 379/88; 379/89
[58] Field of Search .................. 379/93, 92, 94, 88, 379/89, 142, 127, 245, 246; 370/61, 110.1

[56] References Cited

U.S. PATENT DOCUMENTS

| | | | |
|---|---|---|---|
| 4,845,739 | 7/1989 | Katz | 379/92 |
| 4,972,462 | 11/1990 | Shibata | 379/98 |
| 4,985,914 | 1/1991 | Fukunaga | 379/88 |
| 4,994,926 | 2/1991 | Gordon et al. | 374/114 |
| 4,996,704 | 2/1991 | Brunson | 379/94 |

Primary Examiner—Jin F. Ng
Assistant Examiner—Jason Chan
Attorney, Agent, or Firm—Finnegan, Henderson, Farabow, Garrett & Dunner

[57] ABSTRACT

A text mail system in which a pseudo destination subaddress randomly generated at a call receiver side at the time of receiving an incoming call from an integrated services digital network is used to manage the storing or reading out operation of various sorts of messages in a mail box. The text mail system, which uses the pseudo destination subaddress as a box number based on the property that the pseudo destination subaddress is randomly given for each incoming call, can secure a high mail confidence.

15 Claims, 9 Drawing Sheets

TEXT MAIL SYSTEM USING ISDN AND ISDN COMMUNICATION TERMINAL DEVICE FOR USE THEREIN

BACKGROUND OF THE INVENTION

1. Field of the Invention

The present invention relates to a text mail system which utilizes an integrated services digital network (which will be referred to as the ISDN, hereinafter) for exchange of text messages and a communication terminal device for use in a text mail system and more particularly, to an embodiment of how to realize the confidential operation of a mail box in which the text messages are temporarily stored.

2. Description of the Related Art

Some conventional communication terminal devices connected to a public telephone network have a so-called automatic answering function, that is, when a user of a communication terminal device as a call receiver is not at home, a message from a caller is stored in the terminal device and later the user can read out the message from the terminal device and confirm it at any time.

Such communication terminal devices, as functions associated with the automatic answering function, further have a function of storing a business message of the caller sent in response to an answering message of the call receiver, a function of reproducing the stored business message through user's direct operation, and a function of sending to all callers answering messages previously stored by the user.

There has been demanded a formation of such a so-called text mail system in which a mail box is opened by utilizing message managing functions of a communication terminal device so that a call receiver can confirm a business message stored in the mail box from a specific party, can store an additional message in response to the message left by the specific party in the mail box, and when receiving a further call from the specific party, can send the additional message only to the specific party.

With this type of communication terminal devices, however, since the communication terminal devices are connected to a public telephone network, a call receiver terminal cannot identify a caller terminal and thus when storing text business messages from callers, the call receiver inevitably must store the text business messages from all the callers.

Further, when sending out the answering message from the call receiver, the answering message is sent to all the callers for the similar reason to the above.

In other words, according to the automatic answering function of this sort of communication terminal device, any consideration is not paid at all to the data confidence or security of the mail box and thus it is impossible to form such a text mail system as sufficiently practical.

As its improvement, there has been proposed such a system that, when a call receiver receives a call associated with the aforementioned automatic answering function, a specific calling party sends to the call receiver a PB dial signal containing a code for specifying the caller.

With this system, since the call receiver can specify the caller party by detecting the code sent from the caller at its PB dial signal receiver and thereafter when the call receiver stores the business message or sends an answering message to the specific party, the communication terminal device having the automatic answering function can be used as a highly practical text mail box.

Even this system, however, has been insufficient in the function of the text mail system because the manner to provide the code data for specifying the caller cannot secure its strict data confidence.

Meanwhile, as the ISDN is recently put in practical use, there have been provided communication terminal devices for connection with the ISDN which can have such a text message automatic answering function as mentioned above.

In the case where such a sort of ISDN communication terminal devices are used, one of the communication terminal devices as a call receiver terminal can specify a caller party, at the time of receiving a call, by utilizing such service inherent in the ISDN that address information of the caller terminal is informed from the network.

Thus, it is considered that, when such a text mail system is formed utilizing the automatic answering function of the ISDN communication terminal devices, the aforementioned party specifying function enables the realization of highly confidential operation of the mail box in the system.

However, the caller address information used in the ISDN is determined by the caller side to merely identify the caller and is not determined at the call receiver side in association with a call issued from a specific party.

For such reasons, even though this sort of conventional ISDN communication terminal device can recognize, at the time of receiving a call, the caller on the basis of the caller address information of the call received from the ISDN but cannot determine that the call is associated with a once-received call or not.

Accordingly, in the event where, in a text mail system utilizing this sort of ISDN communication terminals for example, one of a plurality of users commonly using one of the terminals calls another terminal (call receiver), the call receiver only recognizes the caller on the basis of the caller address information of the received call and immediately operates to start sending an additional message to the caller, but the call receiver cannot operate to send respective additional messages to the individual calls of the plurality of common users of the single communication terminal as the caller terminal.

In other words, this sort of system is the same in the point that the additional messages so far stored are all sent out regardless of from whom the call is issued and thus eventually, it is impossible in the current circumstances to form such a text mail system that can secure a high data confidence even when utilizing, in particular, the automatic answering function of this type of conventional ISDN communication terminal devices.

SUMMARY OF THE INVENTION

It is therefore an object of the present invention to provide a text mail system based on an ISDN in which, when receiving a call from the ISDN, a call receiver terminal can specify not its caller terminal but its received call itself to manage various sorts of text messages and thus a text mail box can be operated with a high confidence.

Another object of the present invention is to provide a communication terminal device for use with an ISDN which can make most use of the automatic answering function of its terminal device itself or the data transmission service inherent in the ISDN and which suitably form a text mail system based on the ISDN.

A further object of the present invention is to provide a communication terminal device for use with an ISDN which can be used both under the high confidential operation of a mail box and under the low confidential operation thereof.

In accordance with an aspect of the present invention, one of the above objects is attained by a text mail system based on an integrated services digital network connected with a plurality of communication terminal devices, each of the communication terminal devices comprising memory means at least having an area for storing therein an answering message and a business message for use in automatic answering operation; automatic answering operation control means, when receiving a call from the network in an automatic answering operation mode, for reading out the answering message from the memory means and sending the answering message to a caller side and also for storing in the memory means the business message received from the caller side with respect to the answering message; mail box operation control means for operating an area of the memory means as a mail box for the text message by storing or reading out the business message and the answering message into or from the memory means in association with a specific box number; pseudo subaddress generation means for randomly generating a pseudo destination subaddress at the time of receiving the call from the network in the automatic answering operation mode; and notification means for informing the caller side of the pseudo destination subaddress; and wherein, at the time of receiving the call from the network in the automatic answering mode, one of the plurality of communication terminal devices as a call receiver terminal randomly generates the pseudo destination subaddress and informs another of the plurality of communication terminal devices as a caller terminal of the pseudo destination subaddress, the caller terminal transmits a call information in which the pseudo destination subaddress informed from the call receiver terminal is contained as necessary to utilize the pseudo destination subaddress as the box number when the memory means of the call receiver terminal is used as the mail box.

In accordance with another aspect of the present invention, there is provided a communication terminal device for use with an integrated services digital network, which terminal device comprises memory means at least having an area for storing therein an answering message and a business message for use in automatic answering operation; automatic answering operation control means, when receiving a call from the network in an automatic answering operation mode, for reading out the answering message from the memory means and sending the answering message to a caller side and also for storing in the memory means the business message received from the caller side with respect to the answering message; detection means for detecting a specific destination subaddress contained in an incoming call information received from the network; pseudo destination subaddress generation means for randomly generating a pseudo destination subaddress when the detection means fails to detect the specific destination subaddress in the automatic answering operation mode; re-call condition notification means for informing the caller side of how to re-call utilizing the pseudo destination subaddress; business message reception control means for storing in the memory means the business message received from the caller side in response to the answering message sent to the caller side at the time of reception of the incoming call in association with the pseudo destination subaddress; business message reference means for selecting and displaying one of business messages stored in the memory means through assignment operation; additional message creation means for creating an additional message to the selected business message; additional message memory control means for storing in the memory means the additional message in association with the pseudo destination subaddress of the business message referenced at the time of creating the additional message; and mail operation control means, when the detection means detects the specific destination subaddress contained in the incoming call information received from the network, for reading out one of the additional messages associated with the pseudo destination subaddresses from the memory means and sending the read-out additional message to the caller side and also for storing in the memory means the business message for the additional message received from caller side in association with the same pseudo destination subaddress.

In the communication terminal device of the present invention, in informing the pseudo destination subaddress from the call receiver side to the caller side, the call receiver side sends to the caller side a user/user information message of D-channel communication protocol messages to be transferred with the caller side with a message prompting the caller side to call the call receiver side by adding the pseudo destination subaddress to be informed when it is desired to use the memory means as the mail box.

The communication terminal device of the present invention further comprises special additional message management means for storing or reading out a special additional message with respect to the memory means in association with a fixed destination subaddress different from the pseudo destination subaddress; second detection means for detecting the fixed destination subaddress contained in an incoming call information received from the network; and modified mail operation control means, when the communication terminal device detects the fixed destination subaddress, for sending to the caller side the special additional message associated with the fixed destination subaddress and also for storing in the memory means the business message to the special additional message received from the caller side in association with the same fixed destination subaddress.

In this way, in accordance with the present invention, when the call receiver side cannot detect the specific destination subaddress (pseudo destination subaddress) in the call information received from the ISDN in the automatic answering operation mode, the call receiver side randomly generates the pseudo destination subaddress and informs the caller side of the fact that the pseudo destination subaddress can be used thereafter as a box number of the mail box.

The notification of the pseudo destination subaddress to the caller side can be realized, for example, by containing the information in the answering message associated with the aforementioned automatic answering function or by carrying out another form of communication protocol containing the information.

In this case, the call receiver side stores in the memory means the business message sent from the caller side responsive to the answering message in association with the pseudo destination subaddress generated with respect to the call.

In this connection, the stored business message can be confirmed by displaying later it on a display through predetermined operation of the caller side and further can store an additional message created for its contents in association with the same pseudo destination subaddress.

Thereafter, the caller side, when it is desired to call to utilize the memory means as a mail box, calls the call receiver side as added with the pseudo destination subaddress informed from the call receiver side at the previous calling time.

The call receiver side, on the other hand, extracts the pseudo destination subaddress from the incoming call information of the received call, reads out the answering or additional message from the area corresponding to the pseudo destination subaddress, and sends it to the caller side.

Further, the business message issued from the caller side in response to the answering or additional message is also stored in the memory means in association with the pseudo destination subaddress of that time.

In this way, in accordance with the present invention, the call receiver, when receiving a call, can judge whether or not the received call is associated with the previously received call on the basis of whether or not the pseudo destination subaddress list stored in its own terminal contains a pseudo destination subaddress which coincides with the pseudo destination subaddress added to the new received call.

In the present invention, when the new call is determined not to be associated with the previously received call (usual received call), the call receiver side randomly generates a pseudo destination subaddress for each call and thereafter, performs the storage or confirmation of the business message with respect to the mail box or the storage of the additional message to its confirmed contents while using the pseudo destination subaddress as a box number when the memory means is used as the mail box. As a result, by making use of the property that the pseudo destination subaddress is randomly generated for each call, a highly confidential text mail system can be formed.

In the case where it is desired to form such a text mail system with use of the ISDN communication terminal devices of the present invention, when each of the communication terminal devices has an automatic answering function for example, the each communication terminal device is required to be added only with means for monitoring the destination subaddress in the call setting message of communication protocol of the call received from the network, means for generating the pseudo destination subaddress if it is not present and means for informing the caller side of the generated pseudo destination subaddress. And other functions, for example, the function of sending the answering or additional message and the function of receiving the business message may be replaced by the partial functions of the aforementioned automatic answering function.

Therefore, in accordance with the present invention, there can be provided a highly confidential mail box system which uses prior art ISDN communication terminal devices having the automatic answering function but slightly modified.

In the communication terminal device of the present invention, the call receiver terminal informs the caller terminal of the pseudo destination subaddress generated at the call receiver terminal by sending a call between the caller and call receiver sides or the user/user information element group of the answering communication protocol message contained by "a re-call condition notification message for prompting to call with the pseudo destination subaddress added", or by sending from the call receiver side to the caller side the answering message containing "the re-call condition notification message for prompting to call with the pseudo destination subaddress added" after establishment of the B-channel between the caller and call receiver terminals.

In this connection, the contents of the answering message containing the aforementioned re-call condition notification message are considered to include, for example, "the request of calling as added with the pseudo destination subaddress based on the current notification at the time of the subsequent calling for confirmation of the additional message".

Either notification method can be realized based on the usual functions of the ISDN communication protocol, which contributes to simplification of "an arrangement of informing the caller side of the pseudo destination subaddress" in the ISDN notification system of the present invention.

Further, in the communication terminal device of the present invention, a fixed destination subaddress arbitrarily set at the call receiver side differently from the pseudo destination subaddress is used to use a certain area of the memory means as a memory area corresponding to the fixed destination subaddress.

The management of the special additional messages in the memory means can also be carried out in association with the respective fixed destination subaddresses, as in the management of the business or additional message based on the aforementioned pseudo destination subaddress.

For example, when the call receiver side receives the incoming call information containing the fixed destination subaddress, the call receiver reads out the special additional message from the memory area of the memory means corresponding to the fixed destination subaddress and sends the read-out special additional message to the caller side and also stores the business message to the special additional message received from the caller side in association with the same fixed destination subaddress.

The special subaddress is informed to the caller side, for example, by transmitting the answering message associated with the automatic answering function to the caller side.

Since this fixed destination subaddress can tell many parties unlike the pseudo destination subaddress randomly generated, such use of the present invention as a bulletin board system of mail box can be realized between parties who know the fixed destination subaddress.

Therefore, in accordance with the present invention, since the aforementioned pseudo destination subaddress and the fixed destination subaddress are selectively used, the operation of the invention can be realized as a practical mail box with both high and low confidence.

DESCRIPTION OF THE PREFERRED EMBODIMENTS

An embodiment of the present invention will be detailed with reference to the attached drawings.

Figure 1:
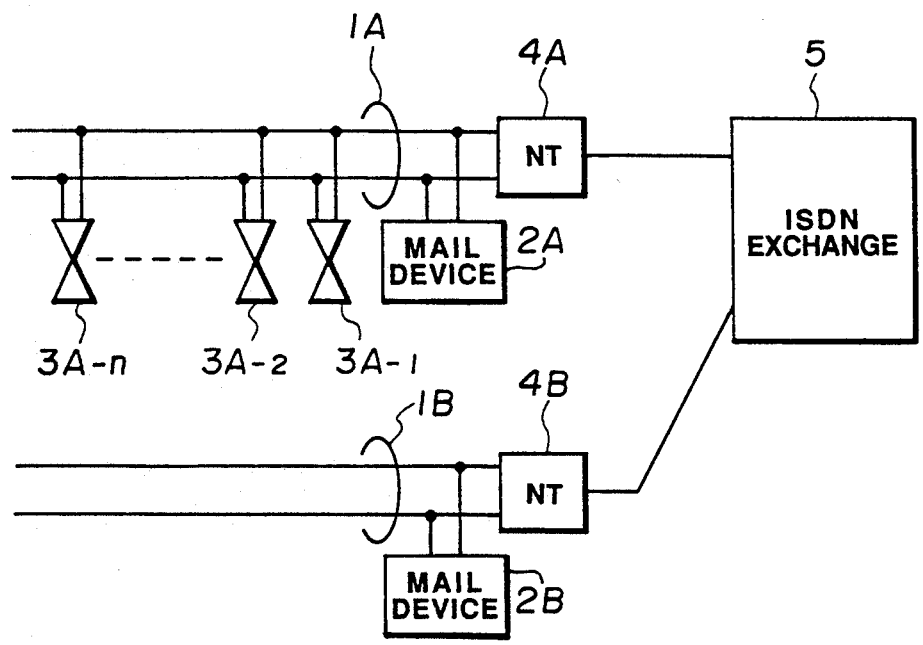
FIG. 1 schematically shows an arrangement of an ISDN communication system in accordance with the present invention.

Referring first to FIG. 1, there is shown an example of an ISDN communication system to which a text mail system in accordance with the present invention is applied. In the ISDN communication system, an ISDN exchange 5 is connected with network terminations 4A and 4B which in turn accommodate subscriber's in-home buses 1A and 1B connected thereto respectively. Connected to the subscriber's in-home bus 1A are a communication terminal device (which will be referred to merely as the mail device, hereinafter) 2A having a text mail function in accordance with the present invention and a multiplicity of ISDN telephone sets 3A-1 to 3A-n. Whereas, the subscriber's in-home bus 1B is connected with a mail device 2B. In the illustrated example, the mail device 2A is exactly the same as the mail device 2B and has such an arrangement as shown, for example, in FIG. 2.

Figure 2:
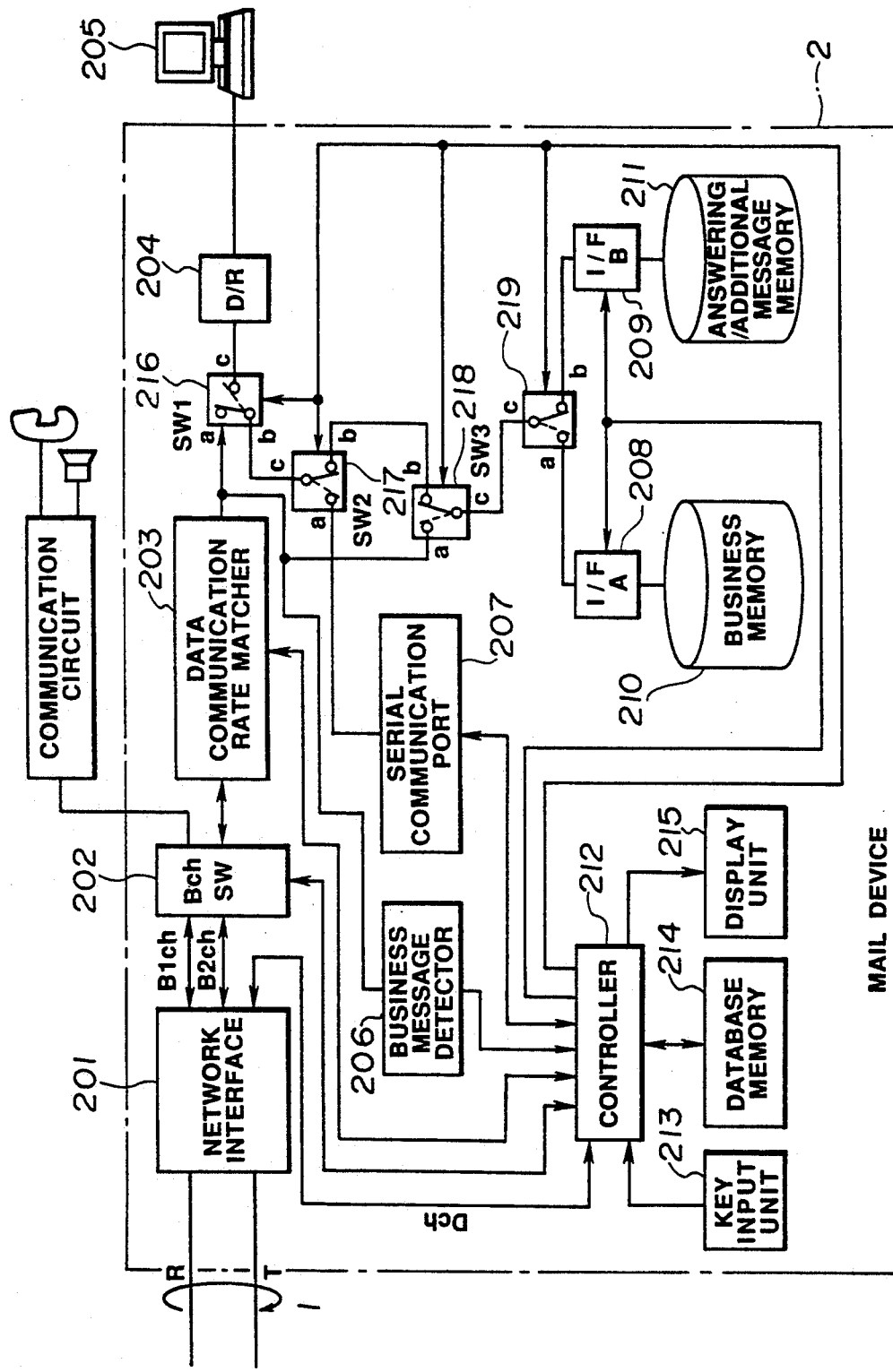
FIG. 2 is a block diagram of an embodiment of one of ISDN communication terminal devices used in the ISDN communication system of FIG. 1.

The mail device 2 of FIG. 2 includes a network interface 201, a B-channel switch circuit 202, a data communication rate matcher 203, a driver/receiver circuit 204, a data terminal such as a personal computer 205, a business message detecting circuit 206, a serial communication port 207, message memory interfaces 208 and 209, a business message memory 210, an additional/answering message memory 211, a controller 212, a key input unit 213, a database memory 214, a display unit 215, and switches 216 to 219.

Figure 3:
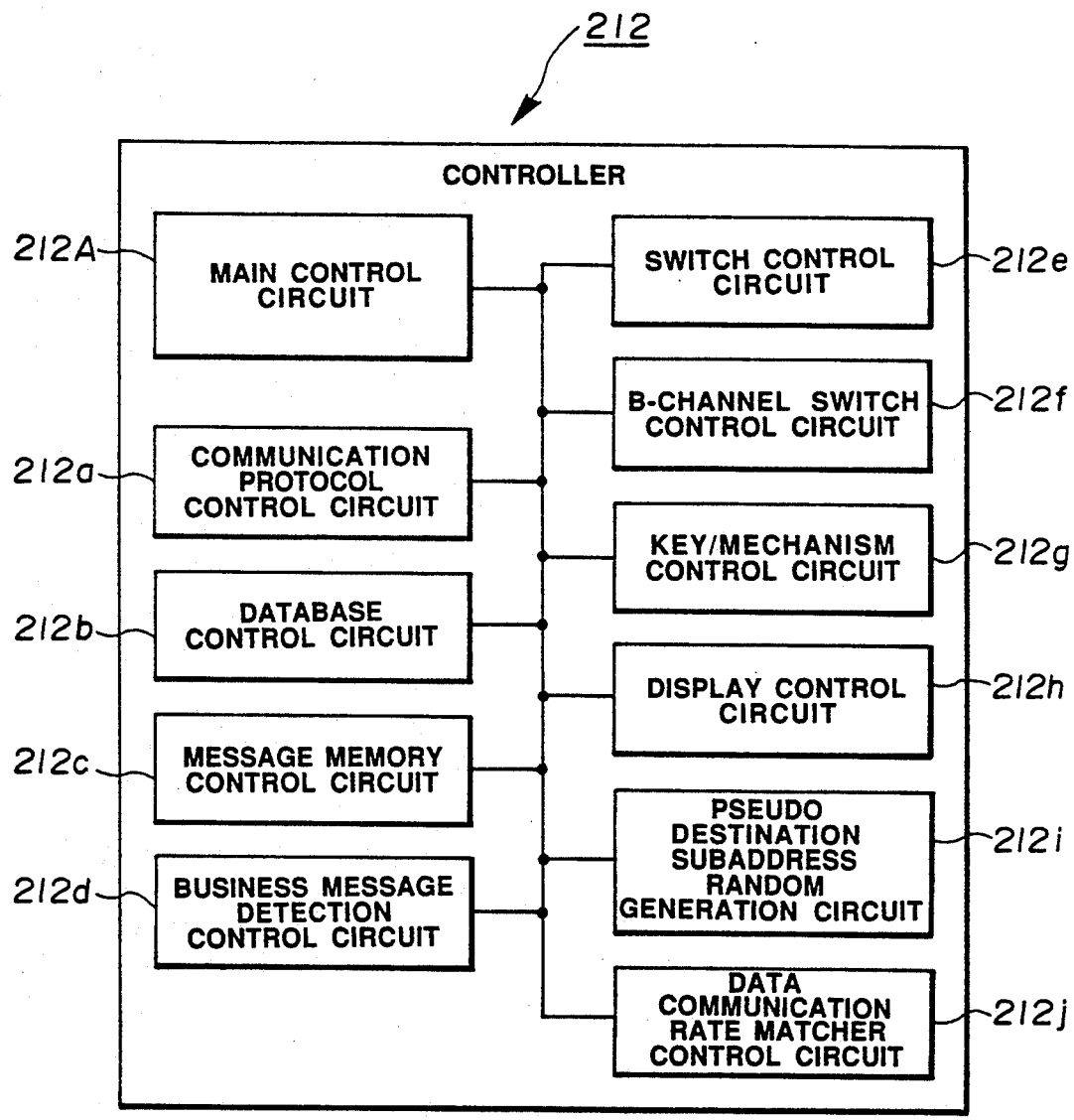
FIG. 3 is a block diagram showing the detailed arrangement of a controller in the communication terminal device of the embodiment of the invention of FIG. 2.

Shown in FIG. 3 is a block diagram showing the arrangement of the controller 212 in the mail device 2. More specifically, the controller 212 includes a main control circuit 212A, a communication protocol control circuit 212a, a database control circuit 212b, a message memory control circuit 212c, a business message detection control circuit 212d, a switches control circuit 212e, a B-channel switch control circuit 212f, a key/mechanism control circuit 212g, a display control circuit 212h and a pseudo destination subaddress random generation circuit 212i.

With the ISDN communication system of FIG. 2 having mail devices 2 of such an arrangement, each of the subscriber's in-come buses 1A and 1B has two 64 Kbps B-channels (data channels) and a single 16 Kbps D-channel (signal channel) to be used on a time-division multiplexing basis, whereby signal transfer can be realized between the mail device 2A and the ISDN telephone sets 3A-1 to 3A-n or between the mail device 2A or ISDN telephone sets 3A-1 to 3A-n and the mail device 2B.

Figure 4:
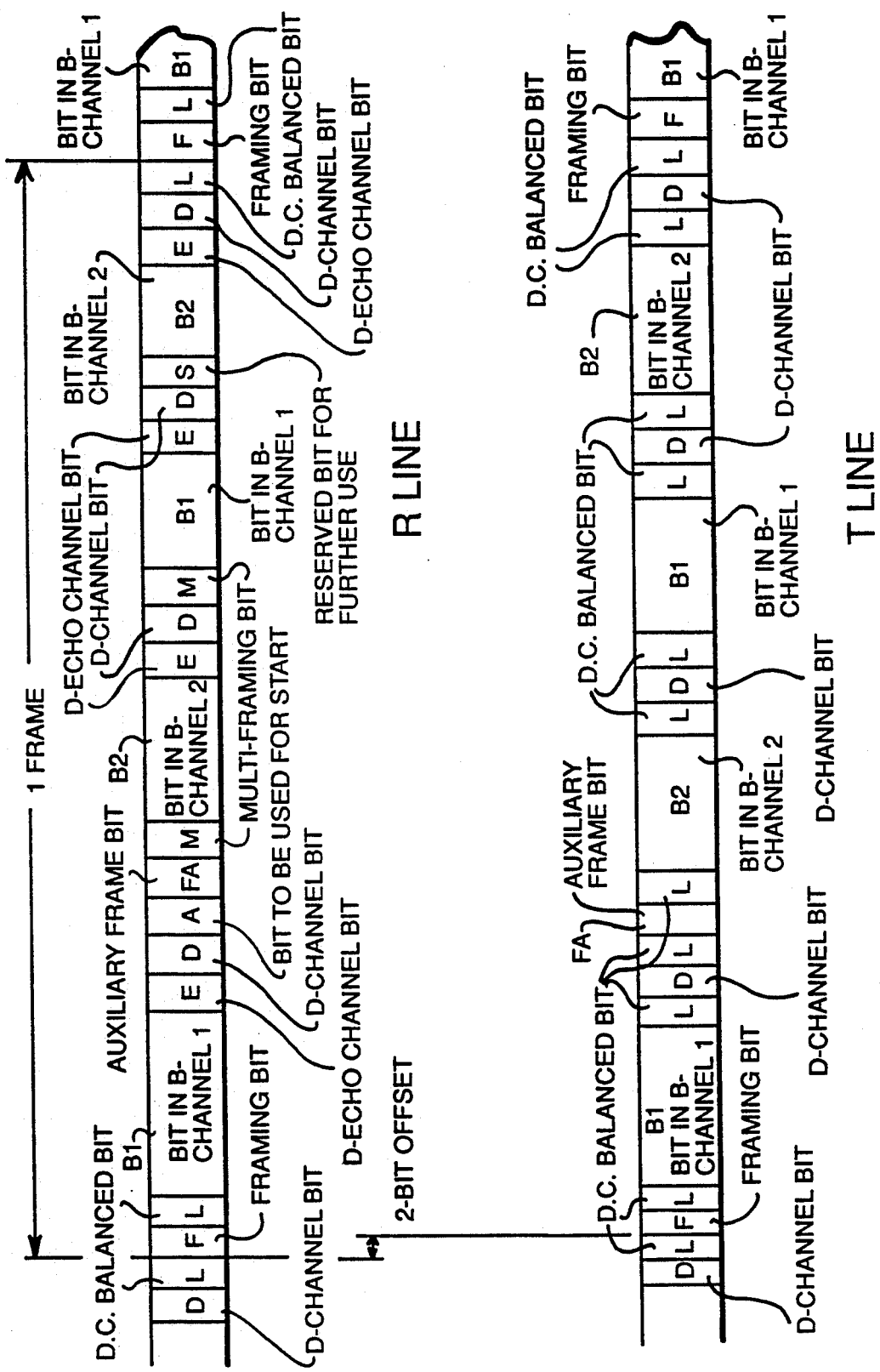
FIG. 4 illustrates one frame structure of a signal used in the communication of the ISDN communication system of FIG. 1.

Signals transferred through the respective channels (2B- and D-channels) have such one-frame arrangements different on receive and send lines R and T as shown in FIG. 4.

In response to transmission or reception of a signal on each of the channels (2B- and D-channels), the mail device 2 (refer to FIG. 2) decomposes at the network interface 201 a digital signal received through the subscriber's in-home bus 1 into two B-channels and one D-channel or assembles at the interface 201 signals received from the B-channels and D-channel into a digital signal to be transmitted. In this case, the digital signals on the B channels are transferred between the network interface 201 and the data communication rate matcher 203 through the B-channel switch circuit 202. The data communication rate matcher 203 performs matching between the bit rate 64 Kbps of the ISDN B-channels and the bit rate (e.g., 9600 bps) of the user data communication. And the rate matching is based on the CCITT (International Telegraph and Telephone Consultative Committee) Recommendation V.110 or the like. A user data signal subjected by the data communication rate matcher 203 to the communication rate conversion is sent through the switch circuit 216 and the driver/receiver circuit 204 to the data terminal 205. The user data signal from the data communication matcher 203 is also connected to the business message detection circuit 206 and also to the message memory interfaces 208 and 209 through the switch circuits 218 and 219. The switch circuit 219 switches between the connection thereof to the message memory interface 208 and the connection thereof to the message memory interface 209. The changeover of the switch circuit 216 causes the data terminal 205 to be connected to the serial communication port 207 through the driver/receiver circuit 204, the switch circuit 216 and the switch circuit 217; whereas the changeover of the switch circuit 217 causes the data terminal 205 to be connected to either one of the message memory interface 208 or 209 through the switch circuits 218 and 219.

Thus, this enables transfer of the user data between the data communication rate matcher 203 and the data terminal 205 and also enables the reception and storage of the additional or answering message between the data terminal 205 and the business or additional message memory 210 or 211 through the message memory interface 208 or 209. This also enables the registration of additional or answering message from the data terminal 205 to the additional/answering message memory 211 through the driver/receiver circuit 204 and the switch circuits 216, 217, 218 and 219; and the changeover of the switch circuit 219 also enables the monitoring of reading of the business message.

As mentioned above, in order to transfer the user data signal between the mail devices 2 with use of their B-channels, it is necessary for the B-channels to be previously set and established between the data rate matchers 203 of the respective mail devices 2. This setting of the B-channel connection is carried out through the D-channel according to a line exchange call control procedure. That is, a signal on the D-channel is transferred between the network and the controller 212 through the network interface 201 separately from the signals on the B-channels in the mail device 2.

In the illustrated example, the controller 212, in particular, the communication protocol control circuit 212a (refer to FIG. 3) analyzes a call setting message transferred through the D-channel and on its analysis result, selects and sets the B-channels for the later communication.

Figure 5:
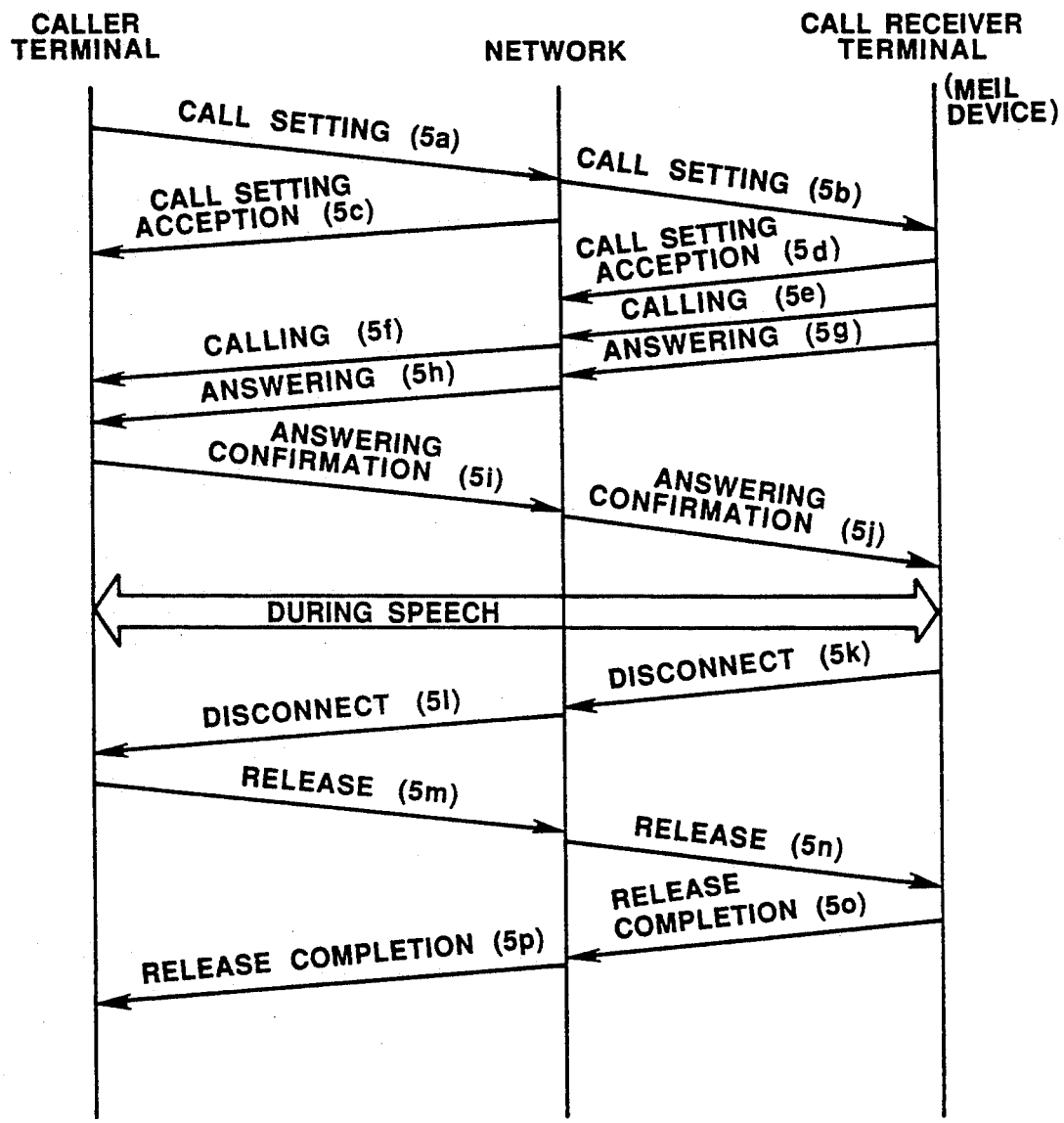
FIG. 5 shows a general example of a communication protocol procedure for a speech carried out in an ISDN.
Figure 6:
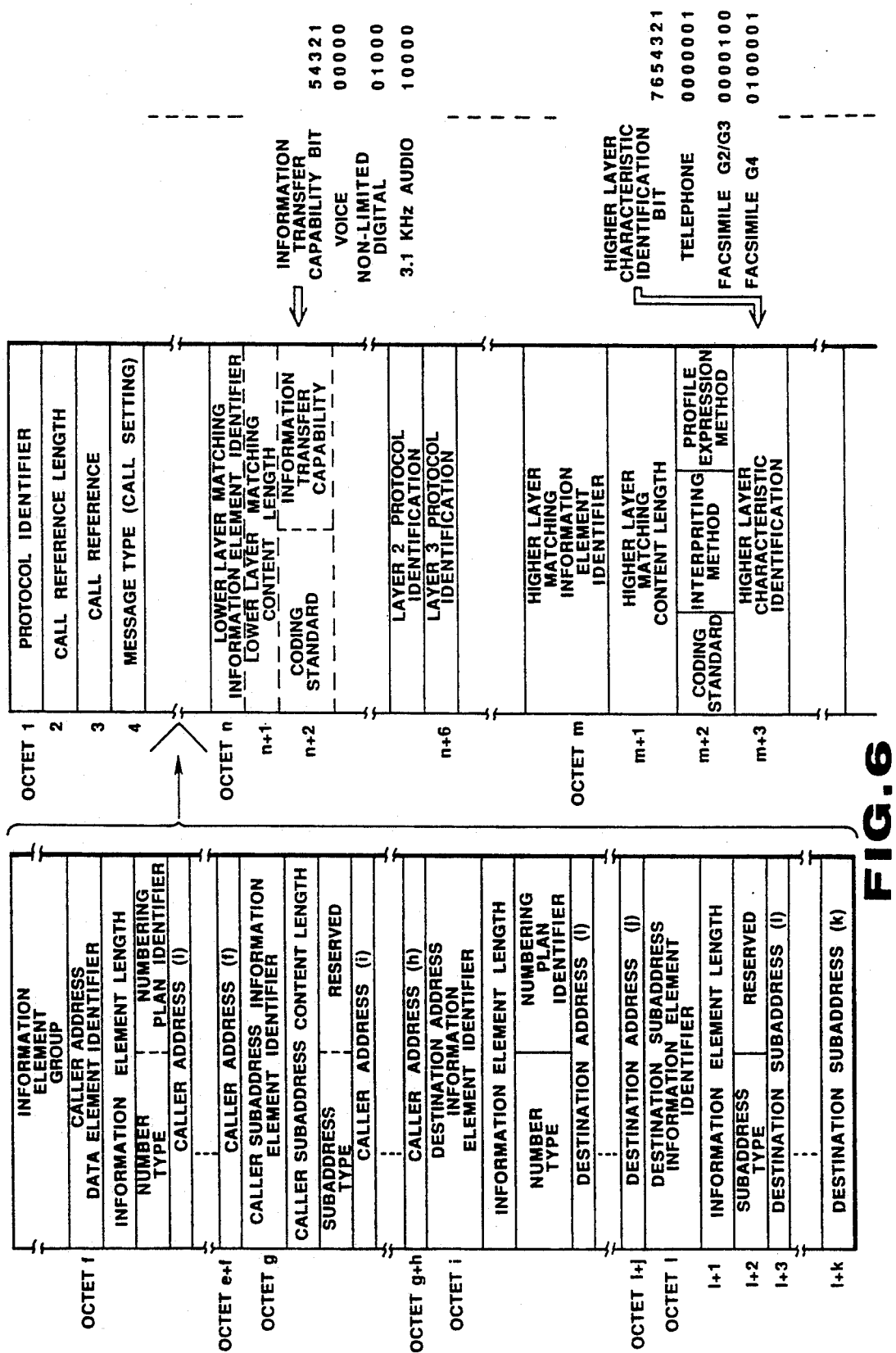
FIG. 6 shows an arrangement of a call setting message as one of communication protocol procedure signals in FIG. 5.

Consider the case where, in such a communication system as shown in FIG. 1 for example, the mail device 2A connected to the network termination 4A of the ISDN (network) calls the mail device 2B connected to the network termination 4B of the same ISDN (network) through the ISDN exchange 5. In this case, such line exchange call control based on a call control sequence as shown in FIG. 5 is carried out between the mail device 2A as a caller terminal and the mail device 2B as a call receiver terminal. In the call control of this line exchange, the network, when accepting a call setting message (5a) based on the call from the caller terminal, sends a call setting message (5b) to the call receiver terminal to inform the call receiver terminal of the presence of the call directed thereto. The call setting message (5b) comprises various sorts of information elements including a destination terminal identification number, for example, as shown in FIG. 6.

Of the various sorts of information, a group of lower layer matching information elements (octets n to n+6) has octet n+2 which contains such information transfer capability information as text, non-limited digital and 3.1 KHz audio, while a group of higher layer matching information elements (octets m to m+3) has octet m+3 which contains such terminal attribute information as telephone, G2/G3 facsimile and G4 facsimile. Further, a group of destination subaddress information elements (octets 1 to 1+k) includes a destination subaddress for specifying a call receiver terminal.

The mail device 2B as the call receiver terminal processes the call setting message received through the D-channel between the controller 212 and the network via the network interface 201 to set the B-channels and on the B-channels, performs various sorts of controls on the basis of various information in the call setting message for the operation of the mail function which forms one of the features of the present invention.

Figure 7A:
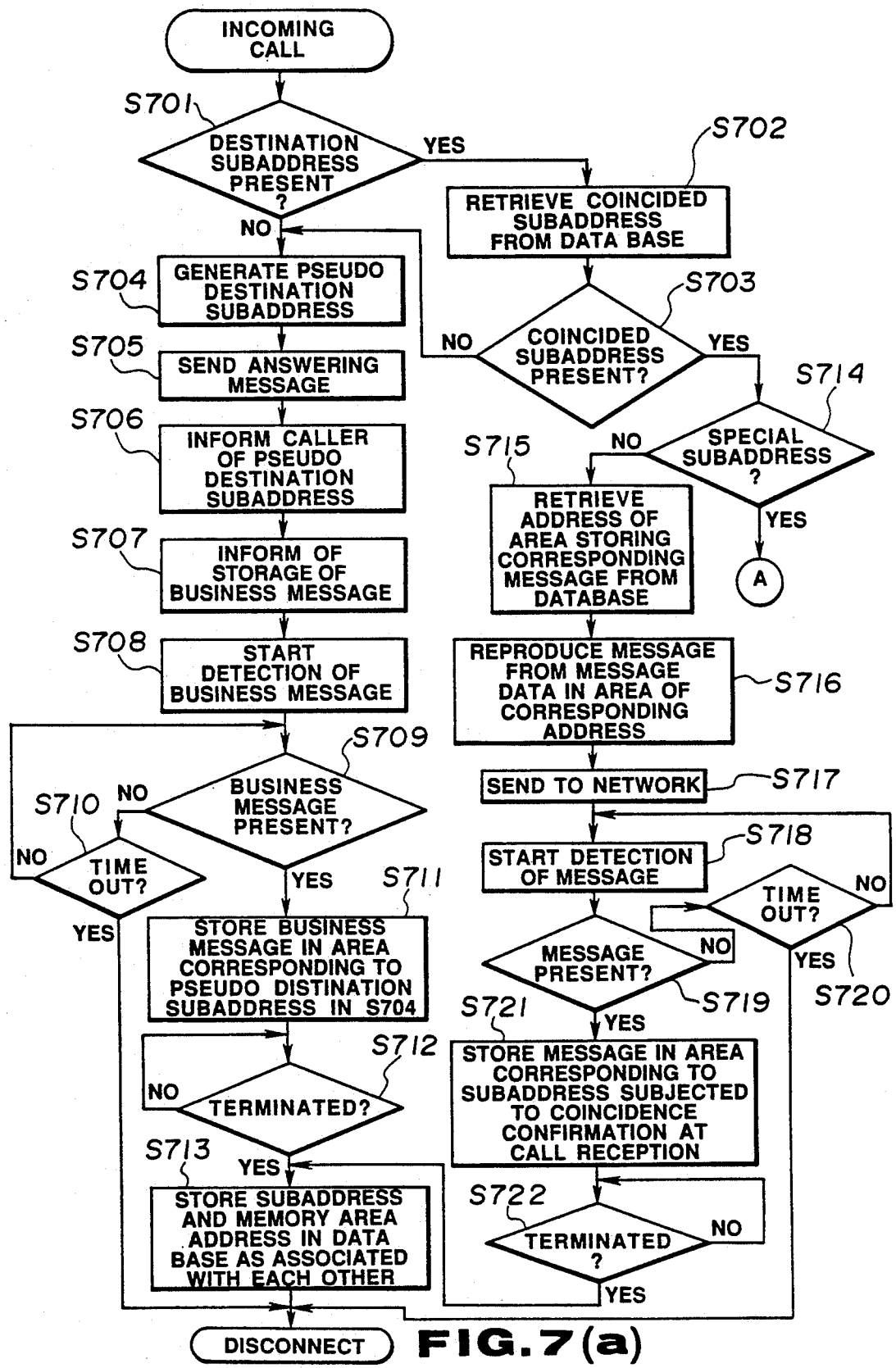
FIGS. 7a-7c are flowcharts for explaining the explanatory operation of mail function of the ISDN communication terminal device of the present invention.
Figure 7B:
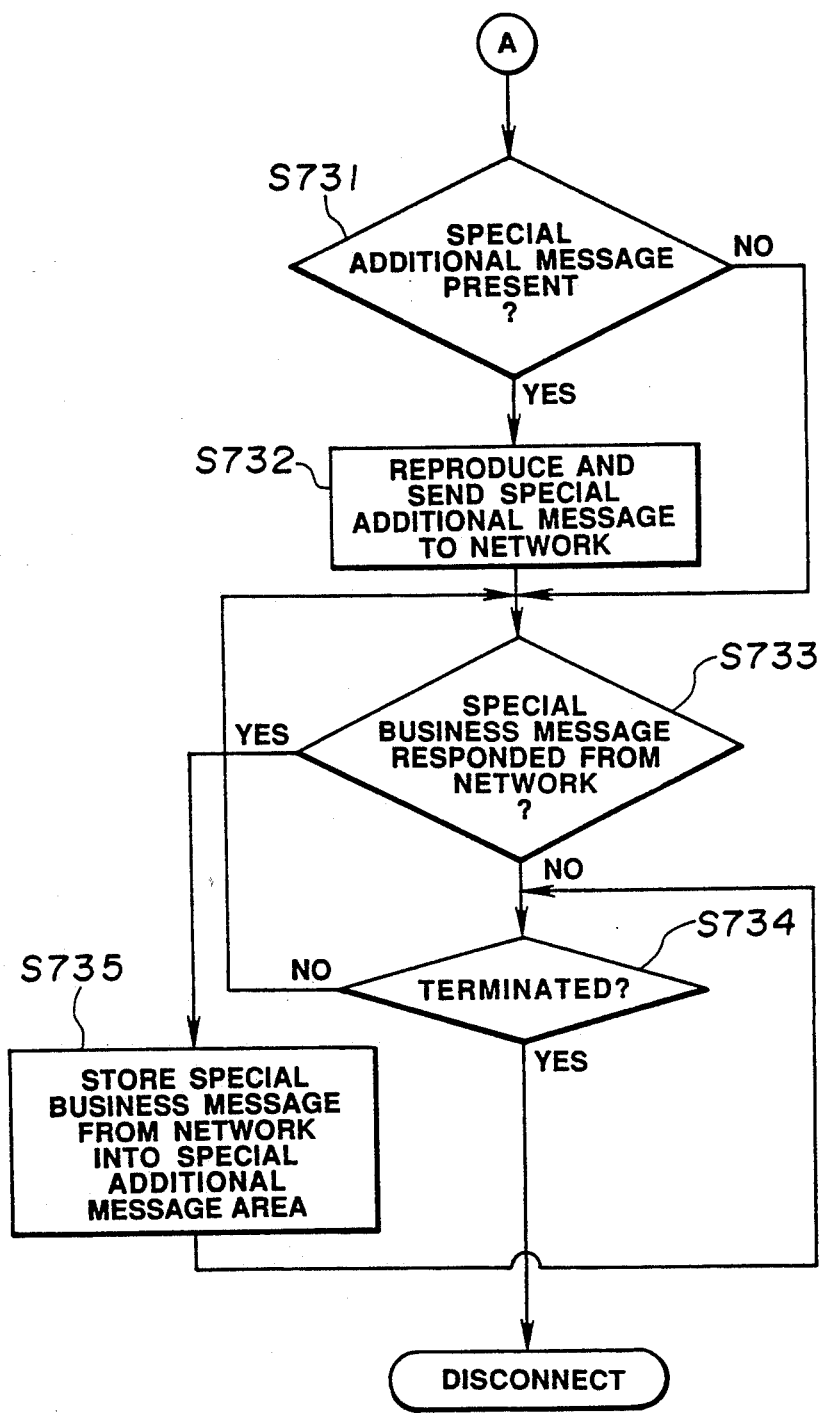
Figure 7C:
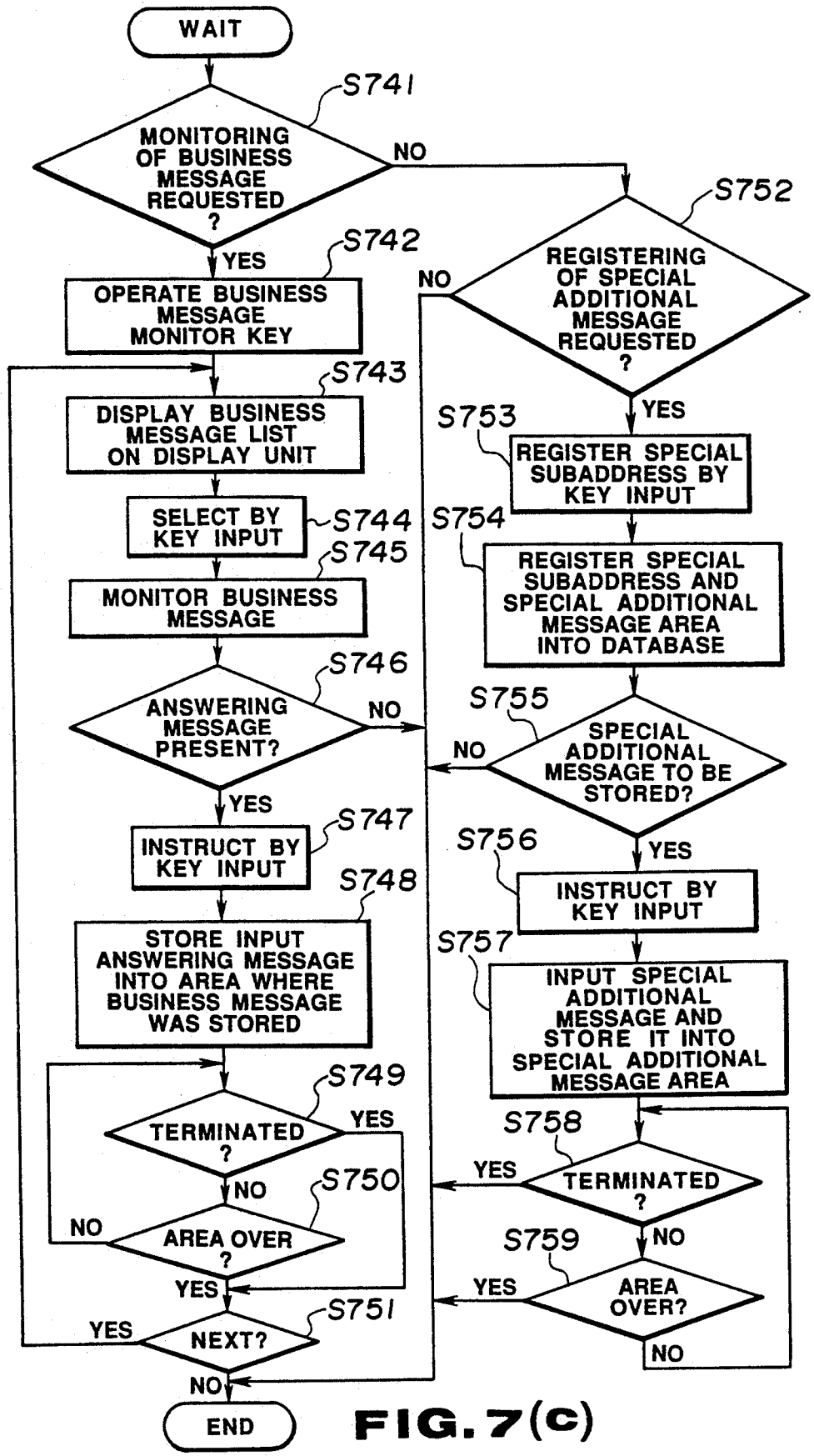

The operation of the mail device 2B as the call receiver terminal in accordance with the present invention will be detailed by referring to a flowchart of FIGS. 7(a) to 7(c).

First, the mail device 2B, when receiving the call setting message from the network, processes the call setting message received through the D-channel between the controller 212 and the network via the network interface 201 and recognizes that the message tells a call for data communication on the basis of the lower and higher layer matching element groups contained in the call setting message. Then the controller 212 checks the presence or absence of a destination subaddress through the retrieval of the destination subaddress information element group in the call setting message (5b) (S701). When determining the presence of the destination subaddress, the controller 212 (database control circuit 212b) retrieves a destination subaddress list (S702) in the database memory 214 and judges whether or not there is one of subaddresses of the list which coincides with the destination subaddress confirmed in the step S701 (S703).

When the controller 212 fails to detect any destination subaddress in the step S701 or when the controller 212 fails to find a destination subaddress coinciding with the received one in the database memory 214 in the step S703, the controller 212 randomly generates at the pseudo destination subaddress random generation circuit 212i a pseudo destination subaddress corresponding to the business message transferred thereafter from the caller side and writes (by means of the message memory control circuit 212c) the pseudo destination subaddress into a predetermined memory area of the answering message memory 211 through the answering message memory interface 209 (S704). Next, the controller 212 (switch control circuit 212e) switches the change-over switches 218 and 219 so as to establish form a data communication channel between the data communication rate matcher 203 and the answering message memory interface 209. Further, the controller 212 (by the B-channel switch control circuit 212e and the data communication rate matcher control circuit 212j) selects the B-channel by the B-channel switch 202 and activates the data communication rate matcher 203 to enable to send the answering message at the B-channel to the network side.

And the controller reads out from the answering/additional message memory 211 and sends to the caller side such an answering message saying, for example, "The business message from your terminal for this message will be stored in connection with a destination subaddress (pseudo destination subaddress) which will be informed to you from now on. When you want to call us for the transmission of the business message or for the confirmation of the additional message, make sure to call us with addition of the destination subaddress currently informed", and also informs the caller side of higher protocol information for receiving and storing the pseudo destination subaddress and the business message (S705 to S707). The caller, when informed of the answering message having such contents, transmits a business message to the call receiver as necessary.

Meanwhile, on the side of the call receiver (mail device 2B), after transmission of the aforementioned answering message, the controller 212 (switches control circuit 212e) controls the switch circuit 219 to connect the serial signal received at the data communication rate matcher 203 to the interface 208.

The controller 212 (business message detection control circuit 212d) further monitors the receive B channels by means of the business message detection circuit 206 to start to detect the presence or absence of a business message returned from the caller side (S708).

If the controller 212 detects a business message received from the caller side in a predetermined time (S709, S710), then the controller 212 (database control circuit 212b) activates the interface 208 and stores the detected business message in an area of the business message data memory 210 corresponding to the pseudo destination subaddress previously randomly generated (S711). Thereafter, the controller recognizes the end of the communication by a disconnect message received from the caller side (S712) and further compares the subaddress in the processing of the step S711 with the stored area address and stores these in the database memory 214 to terminate the series of operations (S713).

When finding in the step S703 one of a list of destination subaddresses (pseudo destination subaddresses) of the database memory 214 which coincides with the destination subaddress confirmed in the step S701, the controller 212 (database control circuit 212b) judges whether or not the destination subaddress corresponds to a special subaddress (S714). When the controller 212 (database control circuit 212b) determines that the destination subaddress is not a special subaddress, the controller 212 retrieves the address data in the answering-/additional message memory 211 stored in association with the above destination subaddress of the database memory 214 (S715). After this, the controller 212 reads out the already stored answering/additional message data from the corresponding area of the answering/additional message memory 211 corresponding to the address data read out through the retrieval of the step S715 (S716) and sends the read-out data to the network (S717).

After sending the answering/additional message, on the side of the call receiver side (mail device 2), the business message detection circuit 206 monitors the receive B-channels under control of the controller 212 (business message detection control circuit 212d) to start detecting the presence or absence of a business message returned from the caller side (S718). Detection of the business message from the caller side in a predetermined time (S719, S720) causes the controller 212 (database control means 212b) to store the detected business message in an area of the business message memory 210 corresponding to the destination subaddress subjected in the step S703 to the coincidence confirmation (S721). Subsequently, the controller recognizes the end of the communication by an on-hook at the caller side (S722), compares the subaddress in the processing of the step S721 with the memory area address, stores these in the database memory 214 and then terminates the series of operations (S713).

In this way, the present invention is arranged so that the destination subaddress in the call setting message in the ISDN communication protocol is used as a sort of box number and when a coincidence therebetween is found at the time of call reception, the box is opened to allow the monitoring of the message and answering to the message.

In this example, since the destination subaddress (pseudo destination subaddress) corresponding to the box number is randomly generated at the call receiver side at the time of the first call reception, the possibility that the subaddress is used for other calls can be very low and therefore a highly confidential text mail box function can be realized.

The mail device 2 in accordance with the present invention can monitor the business message from the caller side stored in the business message memory 210 through the aforementioned control together with the address and subaddress of the caller side as necessary. Further, the monitored business message can be stored with a comment (additional message) added thereto.

An example of this processing will be explained by referring to the flowchart of FIG. 7 (c).

First, when the user wants to monitor a business message (S741), he or she operates a business message monitor key provided on the key input unit 213 to instruct the effect (S742). In response to this key input, the controller 212 (database control circuit 212b) retrieves the database memory 214 and displays the retrieved business message list on the display unit 215 under control of the display control circuit 212h (S743). Further, the user performs keying operation on the key input unit 213 to select desired one of the business messages in the displayed list (S744). This key input causes the controller 212 to display the selected business message on the display unit 215 (S745). Next, when the user looks at the business message on the display screen and wants to send an answering message thereto (S746), he instructs it through the keying operation of the key input unit 213 (S747).

After confirming this keying operation, the controller 212 stones the answering/additional message entered from the data terminal 205 into the area where the business message has been so far stored (S748). Thereafter, the control circuit 212 sequentially judges whether or not the storing operation is terminated and then whether or not an area over takes place (S749, S750). When determining the termination of the storing operation or the area over, the control circuit 212 then judges whether or not there is the next demand (S751). The absence of any demand causes the operation to end. Monitoring of the business message and the registration of the answering/additional message may be carried out by using the data terminal 215.

In the mail device 2 of the present invention, a special additional message may be registered by adding to the additional message a fixed subaddress (special subaddress) which will not coincide with the pseudo destination subaddress randomly generated to monitor or rewrite the special additional message as necessary.

A specific example of this special additional message processing is given in steps S752 to S759 in the flowchart of FIG. 7 (c).

In a wait mode, first, when a registration of a special additional message is requested (S752), the user enters a special subaddress as a registration destination through the keying operation of the key input unit 213 (S753). Next, a special additional message area for the entered special subaddress is secured in the business message memory 210 and the corresponding area is stored in the database memory 214 together with the aforementioned special subaddress (S754). The user then judges whether or not to store the special additional message (S755). When the user determines that it is unnecessary to store the special additional message, this causes the processing to end as it is. When the user determined that it is necessary to store the special additional message, on the other hand, he instructs the effect through the keying operation of the key input unit 214 (S756). Thereafter, the user enters the special additional message from the data terminal 205. This causes the controller 212 to store the entered special additional message in the special additional message area of the business message memory 210 previously secured at step S754 (S757). After this, the controller 212 judges whether or not the storing operation is terminated and then whether or not an area over takes place (S758, S759) and when the storing operation is terminated on when the area over takes place, the controller terminates the operation.

Even the special additional message thus registered can be monitored, as in the normal business message, through the operations of the steps S741 to S751 at the terminal where the registration has been made. Similarly, the special additional message can be sent to the party terminal through the ISDN on on-line basis and a special business message from the party terminal with respect to the sent special additional message can be stored in the same area. Accordingly, the business message memory 210 can be used as a mail box.

Such handling of the special additional message is shown in the flowchart of FIG. 7 (b). More specifically, the processing of FIG. 7 (b) corresponds to a processing A to which branching is made when the destination subaddress is determined to be a special subaddress in the processing of the step S714 in FIG. 7 (a).

In FIG. 7 (b), the call receiver side (mail device 2B), when recognizing the reception of the special subaddress as the destination subaddress, judges whether or not a special additional message corresponding to the special subaddress is already registered (S731). When determining the already registration of the special additional message, the mail device 2B reads out the special additional message and sends it to the network (S732). Thereafter, the mail device 2B monitors the presence or absence of a special business message response from the network (caller side) with respect to the sent special additional message (S733). When determining the absence of any business message, the mail device 2B recognizes the end of the speech by an on-hook of the caller side (S734) and terminates the operation. When determining the presence of the special business message in the step S733, the mail device 2B stores the special business message from the network into the same area where the special additional message previously sent is stored (S735) and terminates the operation.

In the present invention, with respect to the storing operations of the business message and the special additional message from the caller side (S721, S735), these messages from the caller side are overwritten on the previous messages to thereby erase the previous messages.

In this way, in accordance with the present invention, when a business message of a call received through the mail function is to be stored, a subaddress for specifying the incoming call is generated on a pseudo random basis, the generated subaddress is informed to the caller side, and the business message from the caller is stored in the memory area corresponding to the subaddress. While at the call receiver side, an additional message responsive to the business message is stored in association with the subaddress. As a result, not only the additional message stored in the call receiver side can be confirmed by making a call with the informed subaddress attached but also a comment for the confirmed message can be overwritten on the same memory area, whereby the operation of a text mail device can be realized.

In accordance with the present invention, further, a special additional message may be previously stored in association with, for example, a special subaddress independently of the adding operation of the randomly-generated pseudo subaddress, in which case the present invention may also be operated as a text message box among the parties who know this special subaddress.

What is claimed is:

1. A text mail system based on an integrated service digital network connected with a plurality of communication terminal devices, each of said communication terminal devices comprising:

memory means at least having an area for storing therein an answering message for informing a caller side that a called side is in an automatic answering operation mode, an area for storing therein a business message from the caller side to the called side being in the automatic answering operation mode and an area for storing therein an additional message to be conveyed from the called side to the caller side in response to the business message;

automatic answering operation control means, when receiving a call from said network in the automatic answering operation mode, for reading said answering message from said memory means and sending the answering message to the caller side and also for storing ins aid memory means said business message received from said caller side in response to the answering message;

mail box operation control means for operating said memory means as a mail box for text messages by storing or reading out said business message or said additional message into or from the area for the business message or the area for the additional message in said memory means in association with a specific box number;

pseudo destination subaddress generation means for randomly generating a pseudo destination subaddress at the time of receiving said call from the network in said automatic answering operation mode; and notification means for informing said caller side of said pseudo destination subaddress;

wherein, at the time of receiving the call from the network in the automatic answering operation mode, one of said plurality of communication terminal devices as a call receiver terminal randomly generates the pseudo destination subaddress and informs another of the plurality of communication terminal devices as a caller terminal of the pseudo destination subaddress, said caller terminal transmits call information in which said pseudo destination subaddress informed from the call receiver terminal is contained as necessary to utilize the pseudo destination subaddress as said box number when the memory means of said call receiver terminal is used as the mail box.

2. A text mail system as set forth in claim 1, wherein, in informing said pseudo destination subaddress from said call receiver terminal to said caller terminal, after reception of the call causes the call receiver terminal to establish a data channel with respect to the caller terminal, said notification means sends to the caller terminal said answering message with a message prompting the caller side to call the call receiver terminal by adding the pseudo destination subaddress to be informed when said memory means is used as the mail box.

3. A text mail system as set forth in claim 1, wherein, in informing said pseudo destination subaddress from said call receiver terminal to said caller terminal, said notification means sends to said caller terminal a user information message of D-channel communication protocol messages to be transferred with the caller terminal with a message prompting the caller terminal to call the call receiver terminal by adding said pseudo destination subaddress to be informed when said memory means is used as said mail box.

4. A text mail system as set forth in claim 1, wherein each of said plurality of communication terminal devices further comprises a connection interface for connection with an external terminal having at least an information take-in function, an information processing function, an information display function and an information input function, and the respective functions of said external terminal connected through said connection interface are used to perform referencing of said business message, creation of the additional message and storing operation thereof from said memory means used as said mail box.

5. A text mail system as set forth in claim 4, wherein said external terminal comprises a personal computer.

6. A text mail system as set forth in claim 1, wherein each of said communication terminal devices further comprises special additional message management means for storing or reading out a special additional message provided separately from said additional message and commonly used among a plurality of subscribers into or from said memory means in association with a fixed destination subaddress different from said pseudo destination subaddress, and wherein, when a communication terminal device detects said fixed destination subaddress contained in an incoming call information from said network, the communication terminal device sends to the caller terminal said special additional message associated with said fixed destination subaddress and also performs a modified mail operation mode to store in said memory means the business message received from the caller terminal in response to said special additional message in association with the same fixed destination subaddress.

7. A text mail system as set forth in claim 6, wherein said business message, additional message and special additional message are overwritten on said memory means to be stored therein and to erase previously stored messages therein.

8. A communication terminal device for use with an integrated services digital network, comprising:

- memory means at least having an area for storing therein an answering message for informing a caller side that a called side is in an automatic answering operation mode, an area for storing therein a business message from the caller side to the called side being in the automatic answering operation mode and an area for storing therein an additional message to be conveyed from the called side to the caller side in response to the business message;
- automatic answering operation control means, when receiving a call from said network in the automatic answering operation mode, for reading said answering message from said memory means and sending the answering message to the caller side and also for storing in said memory means said business message received from said caller side in response to the answering message;
- detection means for detecting a specific destination subaddress contained in incoming call information received from said network;
- pseudo destination subaddress generation means for randomly generating a pseudo destination subaddress when said detection means fails to detect said specific destination subaddress in said automatic answering operation mode;
- re-call condition notification means for informing said caller side of how to re-call utilizing said pseudo destination subaddress;
- business message reception control means for storing in said memory means the business message received from the caller said in response to said answering message sent to the caller side at the time for reception of said incoming call in association with said pseudo destination subaddress;
- business message reference means for selecting the business message stored in the memory means through a predetermined selecting operation and displaying the business message;
- additional message creation means for creating the additional message responding to said business message;
- additional message memory control means for storing in said memory means said additional message in association with the pseudo destination subaddress of the business message referenced at the time of creating said additional message; and
- mail operation control means, when the detection means detects the specific destination subaddress contained in the incoming call information received from the network, for reading out the additional message associated with the pseudo destination subaddress from said memory means and sending said read-out additional message to the caller side and also for storing in the memory means the business message responding to said additional message received from the caller side in association with the same pseudo destination subaddress.

9. A communication terminal device as set forth in claim 8, wherein, in informing said caller side of how to re-call utilizing said pseudo destination subaddress, after reception of the call causes the call receiver side to establish an information channel with respect to the caller side, said re-call condition notification means sends to the caller side said answering message with a message prompting the caller side to call the call receiver side by adding the pseudo destination subaddress to be informed when said memory means is used as the mail box.

10. A communication terminal device as set forth in claim 8, wherein, in informing said caller side of how to re-call utilizing said pseudo destination subaddress, said re-call condition notification means sends to said caller side a user information message of D-channel communication protocol message to be transferred with the caller side with a message prompting the caller side to call the call receiver side by adding said pseudo destination subaddress to be informed when said memory means is used as said mail box.

11. A communication terminal device as set forth in claim 8, further comprising a connection interface for connection with an external terminal having at least an information take-in function, an information processing function, an information display function and an information input function, and wherein the operations of said business message reference means, said additional message creation means and said additional message memory control means are substituted by the respective functions of said external terminal connected through said connection interface.

12. A communication terminal device as set forth in claim 11, wherein said external terminal comprises a personal computer.

13. A communication terminal device as set forth in claim 8, further comprising:

- special additional message management means for storing or reading out a special additional message provided separately from the additional message and commonly used among a plurality of subscribers into or from said memory means in association with a fixed destination subaddress different from said pseudo destination subaddress;
- second detection means for detecting said fixed destination subaddress contained in the incoming call information received from said network; and
- modified mail operation control means, when said communication terminal device detects said fixed destination subaddress, for sending to the caller side said special additional message associated with said fixed destination subaddress and also for storing in said memory means the business message received from the caller side in response to said special additional message in association with the same fixed destination subaddress.

14. A communication terminal device as set forth in claim 13, wherein said automatic answering operation control means, said mail operation control means and said modified mail operation control means store the business message, the additional message and the special additional message to be controlled in said memory means by means of overwriting to thereby sequentially erase previous message already stored therein.

15. A communication terminal device used in an integrated services digital network, comprising:

memory means at least having an area for storing therein a business message received from a caller side in an automatic answering operation mode and an area for storing therein an additional message inputted from a called side in response to the business message;

notification means for randomly generating a pseudo destination subaddress at the time of receiving a call from the network in the automatic answering operation mode and for informing said caller side of said pseudo destination subaddress; and message storage/read control means for controlling storage or reading out of the business message or the additional message into or from the area for the business message or the area for the additional message in said memory means in association with said pseudo destination subaddress;

wherein, at the time of receiving the call from the network in the automatic answering operation mode, a text mail box is opened in said memory means in association with said pseudo destination subaddress for carrying out a text mail communication by accessing said text mail box with use of said pseudo destination subaddress as a box number.

* * * * *